United States Patent
Van Der Meulen et al.

(10) Patent No.: US 11,207,868 B2
(45) Date of Patent: Dec. 28, 2021

(54) METHOD FOR PRODUCING A LAMINATED PANE

(71) Applicant: SAINT-GOBAIN GLASS FRANCE, Courbevoie (FR)

(72) Inventors: Uwe Van Der Meulen, Nideggen (DE); Stephan Gier, Bous (DE); Richard Brocker, Mönchengladbach (DE); Robert Besler, Herzogenrath (DE); Rene Bischof, Ubach-Palenberg (DE); Stefan Lücke, Spenge (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/769,165

(22) PCT Filed: Nov. 27, 2018

(86) PCT No.: PCT/EP2018/082693
§ 371 (c)(1),
(2) Date: Jun. 2, 2020

(87) PCT Pub. No.: WO2019/110376
PCT Pub. Date: Jun. 13, 2019

(65) Prior Publication Data
US 2020/0338864 A1    Oct. 29, 2020

(30) Foreign Application Priority Data
Dec. 5, 2017    (EP) ...................................... 17205405

(51) Int. Cl.
*B32B 17/10* (2006.01)
*B32B 7/12* (2006.01)
(Continued)

(52) U.S. Cl.
CPC .......... *B32B 17/10036* (2013.01); *B32B 1/00* (2013.01); *B32B 7/12* (2013.01);
(Continued)

(58) Field of Classification Search
CPC ... B32B 17/10036; B32B 37/02; B32B 27/36; B32B 27/306; B32B 1/00;
(Continued)

(56) References Cited

U.S. PATENT DOCUMENTS 5,147,485 A    9/1992  Gajewski et al.
5,980,666 A *  11/1999  Roth .................. B32B 17/10036
                                                       156/107
(Continued)

FOREIGN PATENT DOCUMENTS

CA    2969410 A1 *  7/2016   ........... H03K 17/962
CA    2998306 A1 *  4/2017   ....... B32B 17/10201
(Continued)

OTHER PUBLICATIONS

International Search Report as issued in International Patent Application No. PCT/EP2018/082693, dated Feb. 13, 2019.
(Continued)

*Primary Examiner* — Tahseen Khan
(74) *Attorney, Agent, or Firm* — Pillsbury Winthrop Shaw Pittman LLP

(57) ABSTRACT

A method for producing a laminated pane, wherein a first laminating film, a carrier film, and a second laminating film are provided and joined to form a pre-laminate, wherein the first laminating film, the carrier film, and the second laminating film have the same film thickness, a compensating film and the pre-laminate are arranged to form a layer stack between a first pane and a second pane, wherein, parallel to two side edges of the layer stack, in each case a strip-shaped peripheral film is arranged and the compensating film is (Continued)

Figure 1:
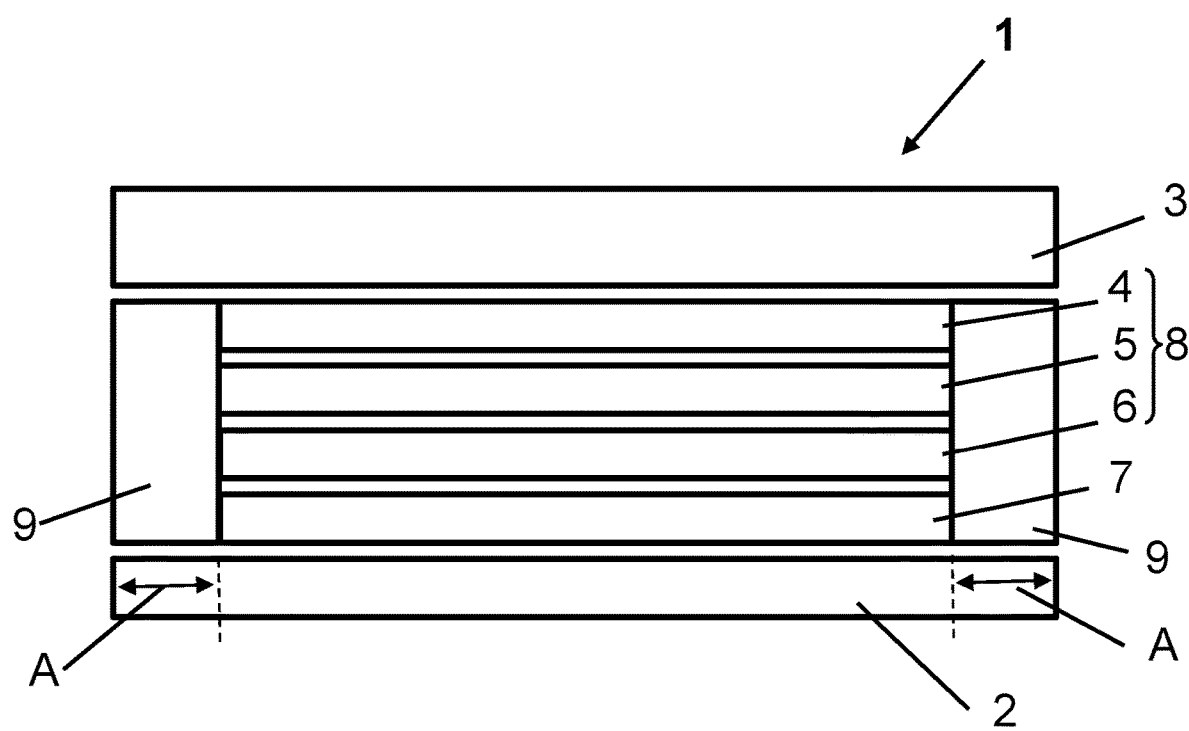

provided to compensate an offset between the pre-laminate and the peripheral films, and the layer stack including the first pane, the pre-laminate, the compensating film with peripheral films, and the second pane is laminated to form a laminated pane, wherein the first laminating film and the second laminating film have a plasticizer content of less than 15 wt.-%.

18 Claims, 5 Drawing Sheets

(51) Int. Cl.

| | | |
|---|---|---|
| *B32B 1/00* | (2006.01) | |
| *B32B 27/30* | (2006.01) | |
| *B32B 27/36* | (2006.01) | |
| *B32B 37/02* | (2006.01) | |
| *B32B 37/04* | (2006.01) | |
| *B32B 37/12* | (2006.01) | |
| *B32B 37/18* | (2006.01) | |
| *B60J 1/02* | (2006.01) | |
| *B60J 1/08* | (2006.01) | |
| *B60J 1/18* | (2006.01) | |

(52) U.S. Cl.
 CPC .. *B32B 17/10293* (2013.01); *B32B 17/10431* (2013.01); *B32B 17/10605* (2013.01); *B32B 17/10761* (2013.01); *B32B 17/10779* (2013.01); *B32B 27/306* (2013.01); *B32B 27/36* (2013.01); *B32B 37/02* (2013.01); *B32B 37/04* (2013.01); *B32B 37/1207* (2013.01); *B32B 37/182* (2013.01); *B60J 1/02* (2013.01); *B60J 1/08* (2013.01); *B60J 1/18* (2013.01); *B32B 2037/1223* (2013.01); *B32B 2250/05* (2013.01); *B32B 2250/40* (2013.01); *B32B 2255/10* (2013.01); *B32B 2274/00* (2013.01); *B32B 2307/416* (2013.01); *B32B 2307/422* (2013.01); *B32B 2419/00* (2013.01); *B32B 2605/006* (2013.01)

(58) Field of Classification Search
 CPC ........ B32B 17/10605; B32B 17/10431; B32B 17/10779; B32B 17/10761; B32B 17/10293; B32B 37/04; B32B 37/1207; B32B 37/182; B32B 7/12; B01J 1/02; B01J 1/18
 USPC .......................................................... 428/214
 See application file for complete search history.

(56) References Cited

U.S. PATENT DOCUMENTS

| | | | |
|---|---|---|---|
| 6,261,398 B1* | 7/2001 | Costa | B32B 17/10972 156/102 |
| 6,410,120 B1* | 6/2002 | Frost | B32B 17/10174 428/174 |
| 10,933,611 B2* | 3/2021 | Kizmaz | B32B 37/12 |
| 2009/0219468 A1 | 9/2009 | Barton et al. | |
| 2016/0312523 A1* | 10/2016 | Miyasaka | E06B 9/24 |
| 2017/0282693 A1* | 10/2017 | Miyasaka | B32B 7/12 |
| 2020/0055284 A1* | 2/2020 | Kizmaz | B32B 17/10788 |

FOREIGN PATENT DOCUMENTS

| | | |
|---|---|---|
| CA | 3025135 A1 | 11/2017 |
| DE | 19503510 A1 | 8/1996 |
| DE | 19902471 A1 | 8/2000 |
| DE | 202 20 494 U1 | 10/2003 |
| EP | 0 371 949 A1 | 6/1990 |
| FR | 2 390 882 A1 | 12/1978 |
| FR | 2 390 882 B3 | 1/1981 |
| JP | H11-512351 A | 10/1999 |
| SU | 27898 A1 | 9/1932 |
| WO | WO 03/024155 A2 | 3/2003 |
| WO | WO 2017/094453 A | 6/2017 |
| WO | WO 2017/157626 A1 | 9/2017 |

OTHER PUBLICATIONS

Notice of Reasons for Refusal as issued in Japanese Patent Application No. 2020-530552, dated Aug. 10, 2021.

* cited by examiner

METHOD FOR PRODUCING A LAMINATED PANE

CROSS-REFERENCE TO RELATED APPLICATIONS

This application is the U.S. National Stage of PCT/EP2018/082693, filed Nov. 27, 2018, which in turn claims priority to European patent application number 17 205 405.8 filed Dec. 5, 2017. The content of these applications are incorporated herein by reference in their entireties.

The invention relates to a method for producing a laminated pane, a laminated pane producible therewith, and use thereof.

Known from DE 202 20 494 U1 is a laminated pane with a film laminate consisting of a plurality of films or layers. The laminated pane usually comprises a PET film enclosed between two laminating films as well as two outer rigid panes of glass or plastic. The outer laminating films are made of polyvinyl butyral (PVB) and serve as adhesive layers to establish the connection between the two rigid panes. The PET film is usually provided with an infrared-reflecting electrically conductive coating that is implemented as a thin layer and serves as a heat reflector such that the laminated pane has very low thermal transmittance.

DE 199 02 471 A1 discloses a curved, transparent laminated pane with a laminate made up of a carrier film provided with a thin layer and outer adhesive layers. The laminated pane has a marginal strip of an opaque material with the carrier film extending over the viewing area cut to size such that its visible edges are still just covered by the marginal strip in a viewing direction.

EP 0 371 949 A1 discloses a laminated glass pane with a sun protection coating including two laminating films and an interposed carrier film with a metallic layer and a dielectric layer. The method for producing such a pane includes, in a first step, the production of a trilayer of laminated films and a coated carrier film, wherein the carrier film is placed between the laminating films. This has the advantage that the scratch-sensitive surface of the coating is protected by a laminating film.

DE 195 03 510 A1 discloses a method for producing an IR-reflecting laminated glass pane provided with an edge seal. The laminated glass pane has a laminate of thermoplastic polymer including a carrier film with an IR-reflecting layer made of metal.

The infrared-reflecting electrically conductive coating is usually transparent and can also optionally be arranged on one of the inner sides of the rigid panes. Such coatings include electrically conductive layers, based, in particular, on silver and are suitable for reducing unwanted heating of an interior. This type of coating is known, for example, in WO 03/024155 A2.

In the automotive sector, such panes are preferably used as a roof panel or a windshield. In addition to the technical requirements for the pane, the aesthetic demands on vehicles are also increasing. This results in a growing demand for visually appealing laminated panes. These often have complex geometries. These include both conventional pane formats with exceptionally strong curvatures and panoramic glass panes. However, because of the large irradiation area, panoramic panes in particular lead to strong heating of the vehicle interior.

Complex curved pane geometries usually have a non-planar surface. Such panes are curved spherically, conically, and/or parabolically and are difficult to implement with different types of materials in the film composite. Due to the different material properties of the film components, the films tend to wrinkle, particularly in the case of highly curved panes.

These wrinkles occur mainly at the corners and edges of the pane since many pane geometries have stronger curvature in these regions. In the prior art, to prevent this wrinkling, the carrier film is cut back at the edges of the pane. In the case of a windshield, the edge region without carrier film is covered by a black screen print applied later in the production cycle. The cutting back of the carrier film demands high precision for the edge region not to be too far into the visible region of the pane.

Production errors such as wrinkling or insertion errors result in a high level of rejects in production since such defective panes must not be sold. A high level of rejects in production leads to an increase in production costs of the end product. Until now, high complexity pane geometries could only be laminated in large quantities in film composites with difficulty and have been very cost intensive.

The object of the present invention is to create a method for producing a laminated pane, as well as a laminated pane in which wrinkling is avoided and the production of the laminated pane is simplified.

The object of the present invention is accomplished by the features of the independent claims. Advantageous embodiments of the invention are indicated in the dependent claims.

The invention relates to a method for producing a laminated pane, in which:
- a first laminating film, a carrier film, and a second laminating film are provided and are joined to form a pre-laminate, wherein the first laminating film, the carrier film, and the second laminating film have the same film thickness,
- a compensating film and the pre-laminate are arranged to form a layer stack between a first pane and a second pane, wherein, parallel to two side edges of the layer stack, in each case a strip-shaped peripheral film is arranged and the compensating film is provided to compensate an offset between the pre-laminate and the peripheral films,
- the layer stack comprising
  - the first pane,
  - the pre-laminate,
  - the compensating film with peripheral films
  - the second pane
- is laminated to form a laminated pane, wherein the first laminating film and the second laminating film have a plasticizer content of less than 15 wt.-%, preferably less than 10 wt.-%, particularly preferably less than 5 wt.-% and are preferably plasticizer-free.

In this method according to the invention, the first laminating film, the carrier film, and the second laminating film have roughly the same film thickness. This has a positive effect on the stiffness of the carrier film. The first laminating film, the carrier film, and the second laminating film can adapt better to the complex shape of the rigid panes such that wrinkling of the films is greatly reduced.

In an advantageous embodiment, first, a pre-laminate, a so-called trilayer, is created from the first laminating film, the carrier film, and the second laminating film. The carrier film is equipped with thermal insulation properties, for example, with an infrared-reflecting coating. The carrier film is arranged between the first laminating film and the second laminating film. By way of example, the pre-laminate can have a length of approx. 1.4 m (longitudinal direction) (140 cm) and a width of approx. 1 m (100 cm). Optionally, the pre-laminate can be embossed, which improves the adhesion of the trilayer. Such a trilayer can be further processed without special precautionary measures and is particularly robust during handling.

In another advantageous embodiment, the layer stack consisting of a laminating film, a carrier film, a second laminating film, and a compensating film can optionally be pre-fixed at points in its peripheral regions by spot welding. The pre-fixing takes place prior to lamination. It makes possible a virtually wrinkle-free film in the laminated pane even with complexly curved pane geometry.

The first laminating film and the second laminating film preferably contain essentially no plasticizers, i.e., the plasticizer content in the laminating films is very low such that degradation of the carrier film by plasticizer molecules diffusing in virtually does not occur. The films have a plasticizer content of less than 15 wt.-%, preferably less than 10 wt.-%, particularly preferably less than 5 wt.-%.

The carrier film has rather high stiffness and the compensating film has comparatively low stiffness. The first or second laminating film has a very low plasticizer content (less than 15 wt.-%, preferably less than 10 wt.-%, particularly preferably less than 5 wt.-%). This results in stiffness of the laminating films that is lower than the stiffness of the carrier film but stiffer than the stiffness of the compensating film. This yields a transition from the rather stiff carrier film to a non-stiff compensating film. With regard to the stiffness of the films, this transition advantageously results in a reduction of wrinkling and provides a virtually wrinkle-free laminated pane.

The laminating films contain at least one thermoplastic polymer, preferably ethylene vinyl acetate (EVA), polyvinyl butyral (PVB), or polyurethane (PU) or mixtures or copolymers or derivatives thereof, particularly preferably polyvinyl butyral. The thickness of the laminating films is preferably from 25 μm to 250 μm (microns), particularly preferably 50 μm.

The carrier film preferably contains at least polyethylene terephthalate (PET), polyethylene (PE), or mixtures or copolymers or derivatives thereof. The carrier film preferably has a thickness of 25 μm to 250 μm (microns), particularly preferably of 50 μm.

Advantageously, an improved adhesive bond and greatly reduced wrinkling occur in the laminated pane with films with these thicknesses and in combination with the peripheral films.

Particularly advantageously, the peripheral film is arranged parallel to the longitudinal edge of the pre-laminate extending in the longitudinal direction of the pre-laminate. The width of the pre-laminate can be roughly 10 times the width of the peripheral film. The laminating film, a carrier film, a second laminating film, and the compensating film can, in each case, be formed in one piece; whereas the peripheral film is formed from at least two strip-shaped pieces, with one peripheral film of the layer stack (consisting of the laminating film, a carrier film, a second laminating film, and the compensating film) and the second peripheral film arranged next to each other between the rigid panes. In addition, two more strip-shaped peripheral films can be arranged on two other edges of the pre-laminate such that the peripheral films surround the pre-laminate like a frame on four sides.

Preferably, the peripheral films have a thickness of 0.38 mm. The laminating films and the carrier films have a significantly thinner film thickness. This results in an offset. The compensating film can be provided as compensation between the pre-laminate and the peripheral films. After treatment of the layer stack in the autoclave per the method according to the invention, the first pane and the second pane are joined via the pre-laminate, the compensating film, and the peripheral films. The pre-laminate, the compensating film, and the peripheral films are subjected to strong deformations in the autoclave. Despite the effect of tensile forces, wrinkle-free assembly of the laminated pane adapted to the geometry of the laminated pane is ensured.

In another embodiment, a first thermoplastic bonding film can be arranged between the compensating film and the first pane. Alternatively, or additionally, a second thermoplastic bonding film can be arranged between the pre-laminate and the second pane.

The compensating film and the first thermoplastic bonding film as well as the second thermoplastic bonding film contain a thermoplastic polymer, preferably ethylene vinyl acetate (EVA), polyvinyl butyral (PVB), or polyurethane (PU) or mixtures or copolymers or derivatives thereof, particularly preferably polyvinyl butyral. The thickness of the first thermoplastic bonding film is preferably from 0.2 mm to 2 mm, particularly preferably from 0.3 mm to 1 mm, for example, 0.5 mm. The thickness of the compensating film is determined by the difference in thickness between the frame film and the so-called trilayer.

Furthermore, before lamination, the pre-laminate can be provided with an incision in a peripheral region, preferably perpendicular to a peripheral film. The depth of the incision is greater than the thickness of the first laminating film and the carrier film. The peripheral region is defined as the portion of the film situated within a distance from the peripheral edge of the panes. Usually, the distance has values between 3 mm and 350 mm. The value depends not only on the application and the shape of the pane (e.g., side window, rear window, or windshield), but also varies within a laminated pane. In particular, in the case of windshields, there is a comparatively large cutback at the engine edge of the windshield (e.g., between 200 mm and 350 mm), whereas there is a much smaller cutback at the roof edge (e.g., 20 mm) and at the side A-pillars (e.g., 10 mm). Due to its low width, the peripheral region can easily be covered by an opaque screen print, as is common in the prior art. The transition between the peripheral region and the rest of the pane is thus covered by the screen print and is not visible as an optically disturbing edge. During lamination, the incision is completely filled with the material of the laminating film such that, after lamination, the incision is again closed. Thus, the edge of the carrier film is isolated from the surroundings of the laminated pane.

The pre-laminate can, for example, be the so-called trilayer or, alternatively, a quadrolayer. The quadrolayer comprises a trilayer and a compensating film, i.e., the compensating film forms the quadrolayer with the first laminating film, the carrier film, and the second laminating film. The pre-laminate, implemented as a trilayer or quadrolayer, is preferably produced at a temperature of up to 100° C.

In another advantageous embodiment, the pre-laminate has an infrared-reflecting, electrochromic, or an electroluminescent functional layer. The infrared-reflecting functional layer can, in particular, be an infrared-reflecting coating. The infrared-reflecting coating can be electrically conductively contacted. Used here as an infrared-reflecting coating is an electrically conductive coating that is connected to an external voltage source via busbars such that a current flows through the conductive coating between the busbars. The coating can additionally function as a heating layer and be used for heating the laminated pane, for example, to defrost or defog the pane.

The method according to the invention can, in principle, be carried out with all functional layers. The functional layer can, for example, be an SPD (suspended particle device) layer or a PDLC (polymer dispersed liquid crystal) layer.

The invention further includes a laminated pane obtainable by the method according to the invention. The laminated pane comprises, arranged flat one above another, at least:
- an outer pane (2),
- a first laminating film (4),
- a carrier film (5),
- a second laminating film (6),
- a compensating film (7) with peripheral films (9), and
- a second pane (3), wherein the first laminating film (4), the second laminating film (6), and the carrier film (5) have the same film thickness.

The laminated pane produced by means of the method according to the invention can be used as a vehicle pane, a watercraft pane, or an aircraft pane, as construction glazing or architectural glazing, preferably as a vehicle pane, particularly preferably as a side window, windshield, roof panel, or rear window.

The outer pane and/or the inner pane preferably contains glass, particularly preferably flat glass, float glass, quartz glass, borosilicate glass, soda lime glass, or plastics, preferably rigid plastics, in particular polyethylene, polypropylene, polycarbonate, polymethyl methacrylate, polystyrene, polyamide, polyester, polyvinyl chloride, and/or mixtures or copolymers thereof.

The thickness of the first pane and/or the second pane can vary widely and thus be ideally adapted to the requirements in the individual case. Preferably, the thicknesses of the outer pane and the inner pane are from 0.5 mm to 10 mm and preferably from 1.4 mm to 3 mm, most particularly preferably 2.1 mm.

The first pane and the second pane can have any three-dimensional shape and, by way of example, can have a length of approx. 1.6 m and a width of approx. 1.3 m. Preferably, the panes are slightly or strongly curved in one or more spatial directions. In particular, the first pane and the second pane can be curved spherically with any complexity, e.g., conically, or parabolically.

The first pane, the second pane, the first laminating film, the second laminating film, or the thermoplastic film can be clear and colorless but also tinted, clouded, or colored. The first pane and the second pane can also be made of non-toughened, partially toughened, or toughened glass.

Advantageously, wrinkling is thus greatly reduced. A reduction in wrinkling results in a reduced share of rejects in the manufacture of a laminated pane, in particular when the laminated pane is curved or sharply curved. Thus, the method according to the invention is significantly more economical in production.

The combined process steps (placing the pre-laminate and the compensating film and the peripheral films on a first pane) can be carried out in any order.

The production of the composite glass by lamination is done with conventional methods known to the person skilled in the art, for example, autoclave methods, vacuum bag methods, vacuum ring methods, calender methods, vacuum laminators, or combinations thereof. The joining of the first pane and the second pane is usually done under the action of heat, vacuum, and/or pressure.

It goes without saying that the features mentioned above and explained in detail in the following can be used not only in the combinations and configurations indicated, but also in other combinations and configurations or in isolation without departing from the scope of the present invention.

In the following, the invention is explained in detail with reference to drawings and exemplary embodiments. The drawings are purely schematic and not to scale. The drawings in no way restrict the invention.

Figure 2:
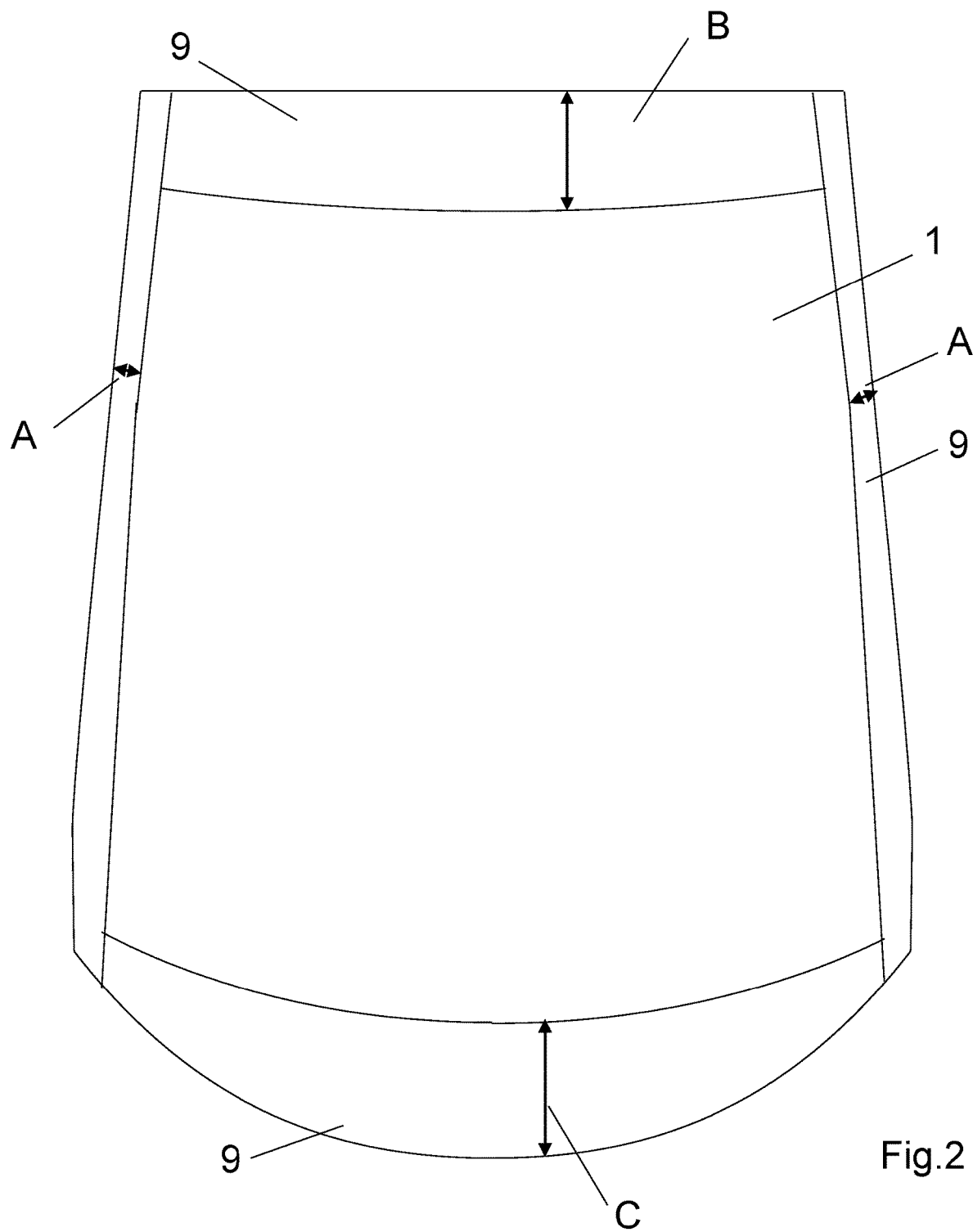
Figure 3:
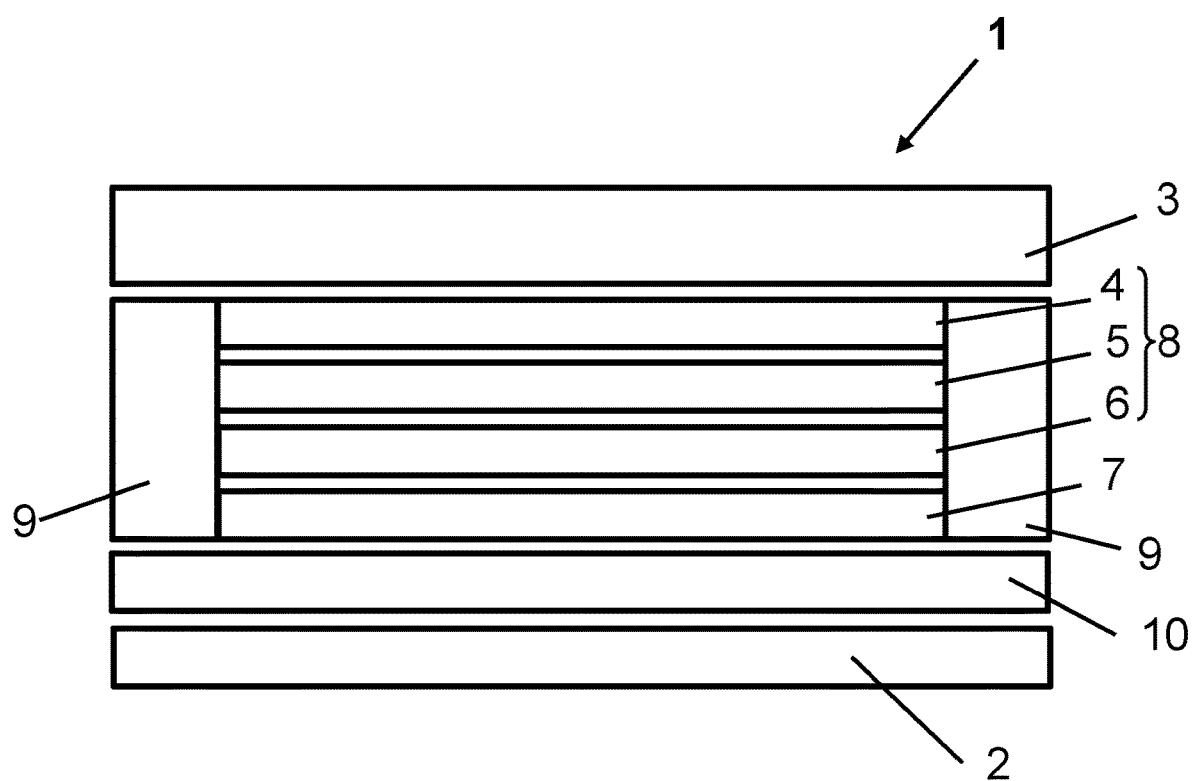
Figure 4:
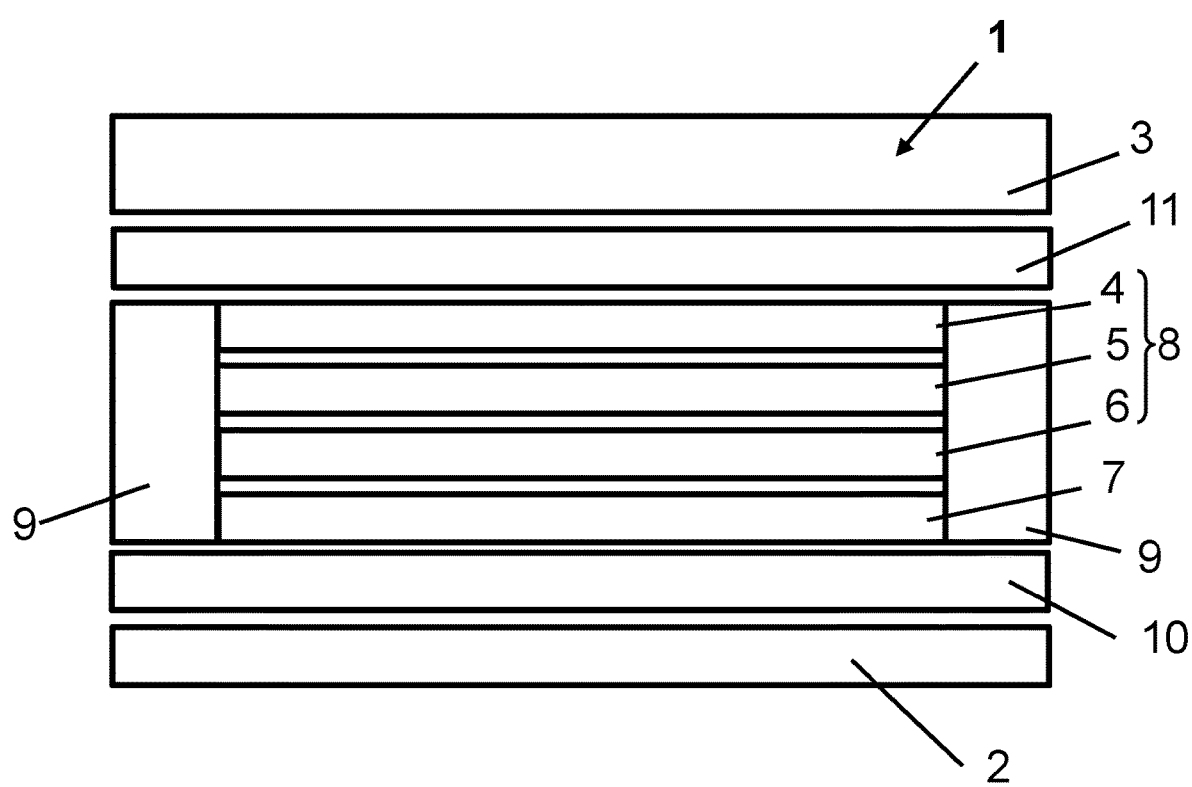
Figure 5:
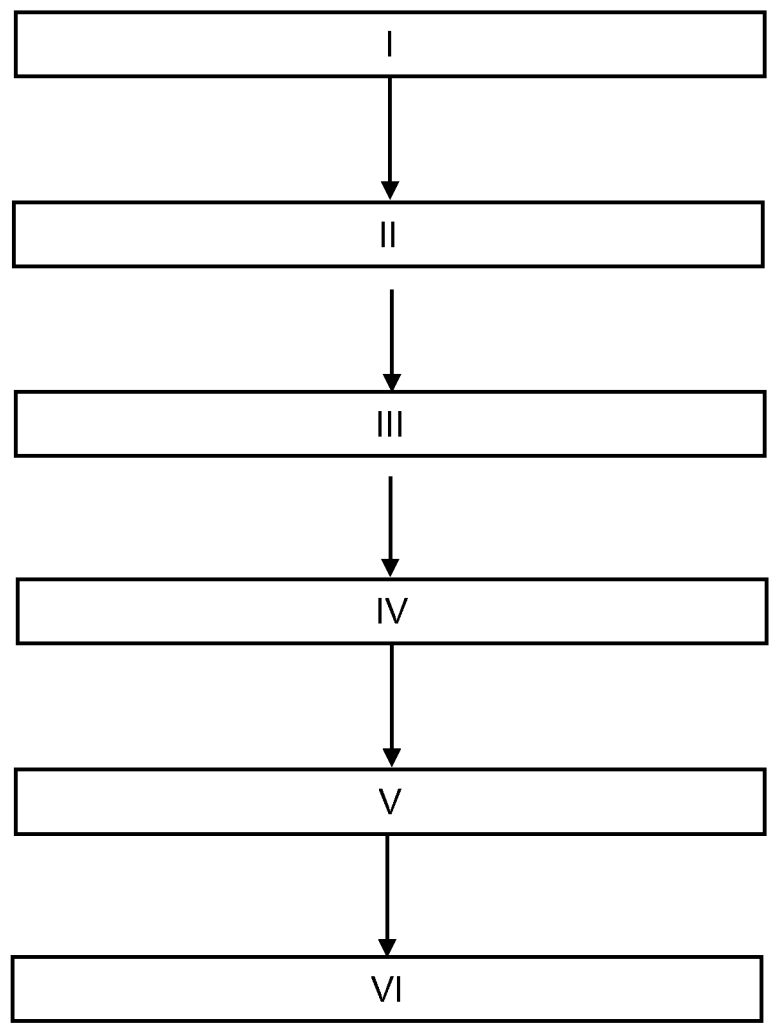

They depict:

FIG. 1 a cross-section of a structure of a laminated pane according to the invention before a lamination process, FIG. 2 a laminated pane according to the invention with a peripheral region, FIG. 3 a cross-section through another embodiment of a structure of a laminated pane according to the invention before a lamination process, FIG. 4 a cross-section through another embodiment of a structure of a laminated pane according to the invention before a lamination process, and FIG. 5 a flow chart of a method according to the invention for producing a laminated pane.

FIG. 1 depicts a cross-section of a structure of a laminated pane 1 according to the invention, here, before the lamination process. The laminated pane 1 consists of a first pane 2 made of soda lime glass with a thickness of 1.4 mm and a second pane 3 made of soda lime glass with a thickness of 2.1 mm. Arranged between the first pane 2 and the second pane 3 is a first laminating film 4, a carrier film 5 with an infrared-reflecting coating, a second laminating film 6, and a compensating film 7. The laminating films 4 and 6 are essentially plasticizer-free PVB films with a very low thickness of approx. 50 µm. The laminating films 4 and 6 as well as the carrier film 5 have roughly the same film thickness. The carrier film 5 can, for example, be a PET film with a thickness of 50 µm. Two strip-shaped peripheral films 9 run in each case at two opposite longitudinal edges of the first and the second panes 2 and 3.

The compensating film 7 is placed centrally on one side of the first pane 2. The shape of the compensating film 5 corresponds roughly to the shape of the first pane 2, wherein at two opposite sides, a strip-shaped peripheral region A of the first pane 2 is not covered by the compensating film. The peripheral region A represents the maximum distance between the pane edge and the compensating film 7 at the edge of the pane.

A so-called trilayer 8 is arranged on the compensating film 7. The trilayer 8 contains at least the first laminating film 4, the carrier film 5, and the second laminating film 6, with the carrier film 5 having previously been bonded to the first and second laminating film (4 and 6) at a temperature of up to 100° C. to form the trilayer 9. In this processing step, the carrier film 5 is embedded between the two laminating films (4 and 6) such that it is protected against environmental influences and is particularly easy to handle during further processing. The shape and size of the trilayer 8 correspond roughly to the shape and size of the compensating film 7 such that a layer stack comprising the compensating film 7 and the trilayer 8 is formed. Parallel to the two side edges of the layer stack, the strip-shaped peripheral film 9 is arranged in each case on the first pane 2; it thus completely fills the free peripheral region A between the first pane 2 and the second pane 3.

The trilayer 8 is thinner than the peripheral films 9, as a result of which an offset would develop at the transition from the peripheral film 9 to the trilayer 8. The compensating film 7 has a thickness that fills this empty space. Ideally, the peripheral films and the layer stack consisting of the compensating film 7 and trilayer 8 should have the same thickness. The compensating film 7 and the peripheral films 9 are, for example, PVB films, with the peripheral films 9 having a thickness of 0.38 mm.

The first pane 2 is bent together with the second pane 3 before a lamination process such that the first pane 2 and the second pane 3 are spherical. The first pane 2 and the second pane 3 can be bent spherically with any complexity, e.g., conically or parabolically. The curvatures of the panes 2 and 3 can, for example, have a cylindrical curvature with a bending radius R1 and/or a second curvature with a radius R2, where R1 is not equal to R2.

Additionally, the laminated pane 1 can contain a first thermoplastic bonding film 10 between the compensating film 7 and the first pane 2 (FIG. 3). Analogously, a second thermoplastic bonding film 11 can be arranged between the pre-laminate and the second pane (FIG. 4). Both the first and the second thermoplastic bonding film 10 and 11 can be PVB films with a film thickness of 0.38 mm and completely cover the first or the second pane 2 or 3. The first and second thermoplastic bonding film 10 and 11 serve as adhesive layers and constitute the bond to the first or second pane 2 and 3.

The laminated pane 1 can, for example, be provided as a roof panel of a motor vehicle.

FIG. 2 depicts a plan view of the laminated pane 1 according to the invention having peripheral films 9 in the peripheral region A, before lamination. Here, the laminated pane 1 has two additional peripheral films 9 in peripheral regions B and C of the laminated pane 1 such that the pre-laminate 8 is surrounded in a frame-like manner by the peripheral films 9.

FIG. 3 depicts a cross-section through a second embodiment of the layer stack according to the invention. Here, the laminated pane 1 includes a first thermoplastic bonding film 10, which is arranged between the first pane 2 and the compensating film 7 or the peripheral film 9, before lamination.

FIG. 4 depicts another embodiment of the layer stack according to the invention. Here, the laminated pane 1 additionally includes a second thermoplastic bonding film 11, which is arranged between the second pane 3 and the first laminating film 4 or the peripheral film 9, before lamination.

FIG. 5 depicts a flow chart of a preferred embodiment of the method according to the invention for producing a laminated pane 1. The steps depicted in FIG. 3 are as follows:

I Providing a first laminating film 4, a carrier film 5, and a second laminating film 6; and joining the first laminating film 4, the carrier film 5, and a second laminating film 6 to form a pre-laminate (trilayer), II Providing the pre-laminate and a compensating film corresponding to the size of the first pane 2, III Placing a compensating film 7 on a first pane, with the compensating film 7 arranged centrally on the first pane 2 such that two free peripheral regions A are created on two longitudinal edges of the first pane IV Arranging the compensating film 7 and the pre-laminate 8 to form a layer stack, wherein a strip-shaped peripheral film 9, whose width corresponds to the peripheral region A, is in each case arranged parallel to two side edges of the layer stack V Placing a second pane 3 on the pre-laminate, wherein one side of the second pane 3 lies flat on the trilayer 8 and peripheral films 9 and covers them completely VI Laminating the stack comprising the first pane 2, the compensating film 7, the pre-laminate with peripheral films 9, and the second pane 3 in the autoclave to form a laminated pane 1.

Optionally, in step I, the pre-laminate (quadrolayer) can consist of the first laminating film 4, the carrier film 5, the second laminating film 6, and the compensating film 7. In addition, the pre-laminate can have embossing that improves the adhesion of the pre-laminate. In another embodiment, the layer stack consisting of the laminating film, the carrier film, the second laminating film, and the compensating film can be pre-fixed at points in its peripheral regions by spot welding with a soldering iron.

The pre-laminate is subjected to severe deformations in the autoclave. Despite the effect of heat and tensile forces on the pre-laminate, a wrinkle-free laminated pane can be ensured. Since, in a first step, the very thin carrier film 5 is embedded between two equally thin laminating films 4 and 6 with very low plasticizer content, its stiffness does not interfere with subsequent manufacturing processes and wrinkling defects in the laminated pane 1 can thus be reduced considerably.

LIST OF REFERENCE CHARACTERS (1) laminated pane
(2) first pane
(3) second pane
(4) first laminating film
(5) carrier film
(6) second laminating film
(7) compensating film
(8) pre-laminate
(9) peripheral film
(10) first thermoplastic bonding film
(11) second thermoplastic bonding film
(A) longitudinal peripheral region
(B) transverse peripheral region
(C) transverse peripheral region

The invention claimed is:

1. A method for producing a laminated pane, the method comprising:

providing and joining a first laminating film, a carrier film, and a second laminating film to form a pre-laminate, wherein the first laminating film, the carrier film, and the second laminating film have the same film thickness, to form a pre-laminate, arranging a compensating film, the pre-laminate and strip-shaped peripheral films adjacent and parallel to side-edges of the pre-laminate, the strip-shaped peripheral films forming a frame on four sides of the pre-laminate, to form a layer stack between a first pane and a second pane, wherein the compensating film is provided to compensate an offset between the pre-laminate and the strip-shaped peripheral films, and laminating the layer stack comprising the first pane,
the pre-laminate,
the strip-shaped peripheral films,
the compensating film, and
the second pane to form a laminated pane, wherein the first laminating film and the second laminating film have a plasticizer content of less than 15 wt.-%, and wherein a stiffness of the first and second laminating films is lower than a stiffness of the carrier film but stiffer than a stiffness of the compensating film, wherein a first thermoplastic bonding film is arranged between the compensating film and the first pane and a second thermoplastic bonding film is arranged between the pre-laminate and the second pane.

2. The method according to claim 1, wherein one of the strip-shaped peripheral films is arranged parallel to a longitudinal edge extending in the longitudinal direction of the pre-laminate.

3. The method according to claim 1, wherein the first laminating film and the second laminating film have a thickness of 25 μm to 250 μm.

4. The method according to claim 1, wherein the carrier film has a thickness of 25 μm to 250 μm.

5. The method according to claim 1, wherein the first thermoplastic bonding film and/or the second thermoplastic bonding film have a thickness of 0.1 mm to 0.8 mm.

6. The method according to claim 2, wherein the strip-shaped peripheral films have a thickness of 0.38 mm.

7. The method according to claim 1, wherein before lamination, the pre-laminate is provided with an incision in a peripheral region, wherein a depth of the incision is greater than the thickness of the first laminating film and the carrier film.

8. The method according to claim 1, wherein before lamination, the compensating film is joined to the first laminating film, the carrier film, and the second laminating film to form the pre-laminate.

9. The method according to claim 2, wherein the pre-laminate is produced at a temperature of up to 100° C.

10. The method according to claim 2, wherein the pre-laminate has an infrared-reflecting, electrochromic, or an electroluminescent functional layer.

11. A method comprising utilizing a laminated pane produced according to claim 1 as a vehicle pane, a watercraft pane, or an aircraft pane, as construction glazing or architectural glazing.

12. A laminated pane obtained by a method according to claim 1, comprising, arranged flat one above another:
- an outer pane,
- a first laminating film,
- a carrier film,
- a second laminating film,
- a compensating film with peripheral films, and
- a second pane,
- wherein the first laminating film, the second laminating film, and the carrier film have the same film thickness.

13. The method according to claim 1, wherein the plasticizer content is less than 5 wt.-%.

14. The method according to claim 13, wherein the first laminating film and the second laminating film are plasticizer-free.

15. The method according to claim 3, wherein the first laminating film and the second laminating film have a thickness of 50 μm.

16. The method according to claim 4, wherein the carrier film has a thickness of 50 μm.

17. The method according to claim 5, wherein the first thermoplastic bonding film and/or the second thermoplastic bonding film have a thickness of 0.38 mm.

18. The method according to claim 11, wherein the laminated pane is a side window, windshield, roof panel, or rear window.

* * * * *